(No Model.)
E. PRESCOTT.
DOUGH KNEADER.
No. 485,822.  Patented Nov. 8, 1892.
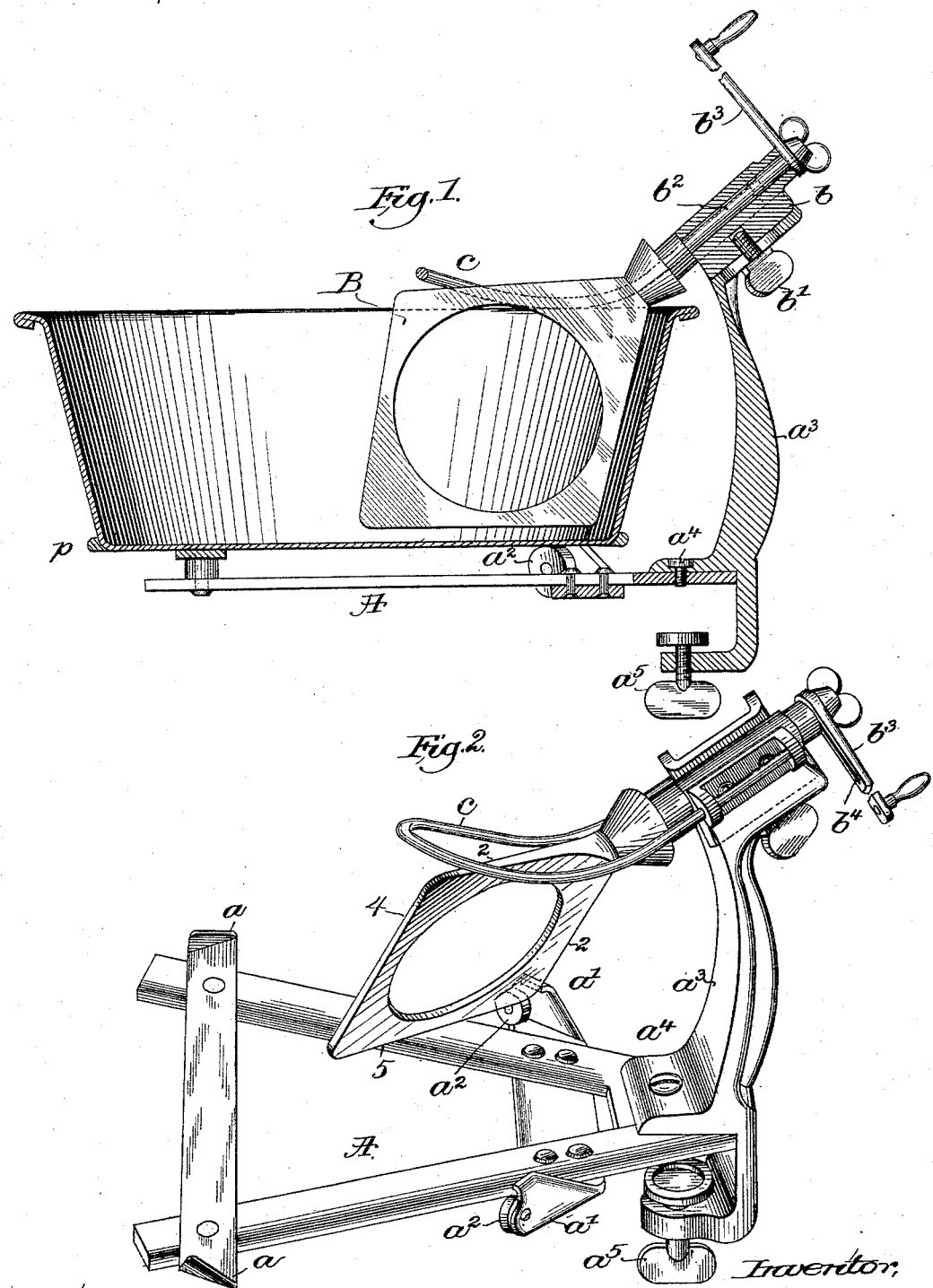
Witnesses.
Louis N. Gowell.
Edward F. Allen.
Inventor,
Edwin Prescott
by Crosby Gregory attys

UNITED STATES PATENT OFFICE.

EDWIN PRESCOTT, OF ARLINGTON, MASSACHUSETTS.

DOUGH-KNEADER.

SPECIFICATION forming part of Letters Patent No. 485,822, dated November 8, 1892.

Application filed June 6, 1892. Serial No. 435,605. (No model.)

*To all whom it may concern:*

Be it known that I, EDWIN PRESCOTT, of Arlington, county of Middlesex, State of Massachusetts, have invented an Improvement in Dough-Kneaders, of which the following description, in connection with the accompanying drawings, is a specification, like letters and figures on the drawings representing like parts.

This invention has for its object to improve that class of machine described in United States Patent No. 201,460, wherein the kneading-blade as it is rotated about its axis of rotation acts on the material at one side the center of the pan and rotates the pan. In this class of machine some difficulty is at times experienced by the accumulation of the dough on the kneading-blade, and the same has had to be removed by a knife.

One part of my invention consists in combining with a kneading-blade a dough-clearer, the latter acting to clear the edges of the blade as they come uppermost. In this way the kneading-blade never becomes unduly clogged so as to carry dough with it, and as a result the machine may be run more easily. I have also provided the bottom of the pan with a rim and have so constructed and shaped the spider which sustains the pan that it presents lips to embrace the rim at that edge of the pan most remote from the kneading-blade, the spider having rollers and guides for the pan between the said lips and the support for the kneader-shaft.

Figure 1 shows a pan and the framework in section, the kneading-blade being in elevation; and Fig. 2 is a perspective view of a dough-kneader with the pan removed.

The framework A consists of a spider or base, preferably of skeleton form and shaped to present lips $a$, ears $a'$, which serve as guides, and rollers $a^2$, journaled on said ears, on which the bottom of the pan P directly under the kneading-blade B rests and travels. The upright $a^3$, also constituting part of the framework, is connected to the spider by a bolt or screw $a^4$ and is provided with a clamp-screw $a^5$, by which to secure the frame to the table. The top end of the upright is shaped to receive a bearing-block $b$, adapted to be secured in place by a turnbutton or screw $b'$. The shaft $b^2$ of the kneading-blade is extended through the bearing and has applied to it a handle $b^3$, the latter being shown as slotted at $b^4$ to enable the handle to be adjusted to the work to be done and the strength of the operator. In this instance of my invention I have made the clearer $c$ as a wire loop so shaped that the edges 2 of the blade as they come uppermost will almost touch the clearer, thus cutting off or breaking the dough mass, so that it will not roll over and over with and ball or bunch on the kneading-blade.

When the pan is in place, the lips $a$ embrace the rim $p$ of the pan, another part of the rim contacting with the guide-ears $a'$, the bottom of the pan resting on the rollers $a^2$. The rotation of the kneading-blade in the flour or dough causes the blade to knead the dough and also rotate the pan, so that the kneading action follows over the mass of material while in the state of dough.

I have shown the blade B as cut away centrally, having found that by providing the blade with a central recess the kneading action is improved. The blade B has two working edges 4 5, and the shaft of the blade occupies a position at an angle to the center of rotation of the kneading-pan.

Having described my invention, what I claim, and desire to secure by Letters Patent, is—

1. The combination, with a kneading-blade, of a dough-cleaner located near the path of movement of the blade, to operate substantially as described.

2. The combination, with a kneading-blade and a kneading-pan having a rim $p$, of a spider having bearings to support the pan at or near the said rim and to embrace the said rim, substantially as described.

3. The combination, with a kneading-pan and a fixed roller-bearing to support it, of lips to limit or define the path of rotation of the pan, substantially as described.

4. The kneading-blade having two angular working edges, a dough-cleaner located near the path of movement of the blade, and a bearing to support the kneading-blade shaft in an inclined position with relation to the center of rotation of the kneading-pan, combined with a crank to rotate said blade in the kneading-pan, substantially as described.

In testimony whereof I have signed my name to this specification in the presence of two subscribing witnesses.

EDWIN PRESCOTT.

Witnesses:
G. W. GREGORY,
EMMA J. BENNETT.